(12) United States Patent
Fasan

(10) Patent No.: US 8,236,079 B2
(45) Date of Patent: Aug. 7, 2012

(54) AIR FILTER SYSTEM FOR A VEHICLE AND METHOD FOR MOUNTING THE SAME

(75) Inventor: Wolfgang Fasan, Erbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 666 days.

(21) Appl. No.: 12/238,081

(22) Filed: Sep. 25, 2008

(65) Prior Publication Data

US 2009/0084344 A1 Apr. 2, 2009

(30) Foreign Application Priority Data

Sep. 27, 2007 (DE) .................... 10 2007 046 218

(51) Int. Cl.
*B01D 46/00* (2006.01)
(52) U.S. Cl. .................... 55/385.3; 123/198 E
(58) Field of Classification Search ............... 55/385.3, 55/490, 502, 505, 507, 513, DIG. 28, DIG. 30; 95/273; 96/108; 123/198 E, 198 A; 180/309; 181/243; 285/263, 331
See application file for complete search history.

(56) References Cited

U.S. PATENT DOCUMENTS

| | | | | |
|---|---|---|---|---|
| 4,080,184 A * | 3/1978 | Petersen | ........................ | 55/315 |
| 5,888,260 A * | 3/1999 | Sica | ................ | 55/331 |
| 5,921,214 A * | 7/1999 | Fujita et al. | ............... | 123/198 E |
| 6,997,967 B2 * | 2/2006 | Storz | ............ | 55/385.3 |
| 7,341,615 B2 * | 3/2008 | Hardenburg | .................. | 55/525 |
| 7,465,329 B2 * | 12/2008 | Oshima | ......................... | 55/385.3 |
| 2003/0159413 A1 * | 8/2003 | Bulger | ......................... | 55/385.3 |
| 2004/0112219 A1 * | 6/2004 | Leffel et al. | ..................... | 96/108 |
| 2004/0139708 A1 * | 7/2004 | Giacinto | ..................... | 55/385.3 |
| 2006/0260469 A1 * | 11/2006 | Miyagishima et al. | ......... | 95/273 |
| 2007/0095324 A1 | 5/2007 | Takahashi et al. | | |
| 2008/0289305 A1 * | 11/2008 | Girondi | ........................ | 55/385.3 |
| 2009/0282793 A1 * | 11/2009 | Tomlin et al. | ................. | 55/385.3 |
| 2010/0050865 A1 * | 3/2010 | Johnson et al. | .................... | 95/17 |

(Continued)

FOREIGN PATENT DOCUMENTS

DE 102008064519 A1 7/2010

(Continued)

OTHER PUBLICATIONS

German Patent Office, German Search Report for Application No. 102007046218.4, dated Sep. 27, 2007.

(Continued)

*Primary Examiner* — Duane Smith
*Assistant Examiner* — Minh-Chau Pham
(74) *Attorney, Agent, or Firm* — Ingrassia Fisher & Lorenz, P.C.

(57) ABSTRACT

An air filter system is provided for a vehicle. The air filter system includes, but is not limited to a raw air duct, a filter housing with an air filter element, and a filtered air duct to an internal combustion engine. The raw air duct and the filtered air duct are connected to a corresponding raw air inlet or a filtered air outlet of the filter housing. The air filter system with filter housing and raw air duct is disposed as a structural unit partly in the engine compartment and partly in an air intake region separate from the engine compartment. An adapter of the air filter system supported on the bodywork of the vehicle is disposed in a transition zone from the engine compartment to the air intake region.

16 Claims, 6 Drawing Sheets

U.S. PATENT DOCUMENTS

2011/0067574 A1* 3/2011 Walz et al. .................. 96/422

FOREIGN PATENT DOCUMENTS

| JP | 60029331 A | 2/1985 |
| JP | 8061170 A | 3/1996 |
| JP | 2008068731 A | 3/2008 |

OTHER PUBLICATIONS

UK Intellectual Property Office, British Search Report for Application No. 0817799.0, dated Mar. 6, 2009.
UK Intellectual Property Office, British Examination Report for Application No. 0817799.0, dated Jan. 30, 2012.

* cited by examiner

AIR FILTER SYSTEM FOR A VEHICLE AND METHOD FOR MOUNTING THE SAME

CROSS-REFERENCE TO RELATED APPLICATION

This application claims priority to German Patent Application No. 102007046218.4, filed Sep. 27, 2007, which is incorporated herein by reference in its entirety.

TECHNICAL FIELD

The technical field relates to an air filter system for a vehicle and a method for mounting the air filter system on the vehicle.

BACKGROUND

Known air filter systems have a raw air duct, a filter housing with an air filter element and a filtered air duct to an internal combustion engine. The raw air duct and the filtered air duct are connected to a corresponding raw air inlet or a filtered air outlet of the filter housing. For this the air filter system with filter housing and raw air duct are mounted as a structural unit partly in the engine compartment and partly in an air intake area separate from the engine compartment.

Known from the U.S. publication no. 2007/0095324 A1 is an air filter system 3 with raw air duct 4 shown in FIG. 6, which is suspended as an assembly unit on a frame of the vehicle. The raw air duct 4 has a fastening eye 27 in the area of a free end 28 with an intake opening 29. The intake opening 29 is disposed in an air intake region 10, from which raw air is sucked into the raw air duct 4 in the direction of arrow A. With another end 30, which extends into an engine compartment 9, the raw air duct 4 fits in a raw air inlet 31 of an air filter housing 5. In this view, no filtered air supply to the internal combustion engine of the vehicle is disposed at the filter housing 5, so that only a filtered air outlet 32 can be seen, from which the filtered air exits in the direction of arrow B towards the internal combustion engine.

Such an air filter system 3 has the disadvantage that during final assembly, during maintenance, during repairs, or during replacement work, the unit comprised of raw air duct 4 and filter housing 5 must be aligned as a unit and installed and fixed around a plurality of components of the engine compartment 9. In this case, the air filter system 3 must be aligned to the individual fastening eyes 27 and fastening points 33, 34 of the raw air duct 4 or the air filter housing 5 in a time-consuming manner and held in position until a secure fixing is possible. The more complex and the larger the air filter system 3 is, the more time-consuming is the simultaneous mounting of an air filter system 3 inside the engine compartment 9 and outside the engine compartment 9 in the air intake region 10. In this diagram the transition zone 11 between engine compartment 9 and air intake region 10 is characterized by a dot-dash line.

In view of the foregoing, it is at least one object to provide an air filter system for a vehicle and a method for mounting the same, which allows a complex structure and nevertheless permits time-saving mounting. It should be possible to mount, maintain, repair, and/or exchange the air filter system easily with few maneuvers or automatically with production robots. In addition, other objects, desirable features, and characteristics will become apparent from the subsequent summary and detailed description, and the appended claims, taken in conjunction with the accompanying drawings and this background.

SUMMARY

According to an embodiment of the invention, an air filter system for a vehicle and a mounting method for an air filter system are provided. The air filter system comprises a raw air duct, a filter housing with an air filter element, and a filtered air duct to an internal combustion engine. The raw air duct and the filtered air duct are connected to a corresponding raw air inlet or a filtered air outlet of the filter housing. The air filter system with filter housing and raw air duct is disposed as a structural unit partly in the engine compartment and partly in an air intake region separate from the engine compartment. An adapter of the air filter system supported on the bodywork of the vehicle is disposed in a transition zone from the engine compartment to the air intake region.

This air filter system has at least the advantage that an adapter pertaining to the air filter system is disposed in the transition zone from the engine compartment to the air intake region. This adapter at the same time fills an opening provided in the bodywork, so that only the filter housing needs to be affixed from the engine side and from the air intake region, only the raw air duct needs to be inserted into the adapter or to be placed on the adapter. This simplifies mounting since the air filter system now no longer needs to be provided as a structural unit in the finished sequence, but the raw air duct can be attached without any problems, independently of the installation of the filter housing, earlier or later in the production sequence.

In addition, the adapter protects the air filter system from sharp-edged passages through the bodywork in order to pass from the air intake region to the engine compartment. Consequently, the hitherto necessary protective bandaging where the raw air duct passes through partition plates between air intake region and engine compartment is omitted. Finally, the adapter can also accommodate damping means, which allow decoupling of the vibration of the filter housing from the bodywork and from the raw air duct. The adapter consequently contributes at the same time to vibration damping and noise minimization.

Preferably, the adapter comprises a first receiving opening for the air intake region and a second receiving opening opposite to said first opening toward the engine compartment. These receiving openings are connected to one another by means of tubular attachments and form a flow-favorable passage of the air flow through the adapter. In this context, it is possible to optimally adapt the cross section of the openings to the circumstances in the engine compartment or the circumstances of the air filter and to the circumstances of the air intake region.

In order to optimally protect the raw air duct and optimally configure the connection to the filter housing, the adapter is disposed in an opening of a partition plate between engine compartment and air intake region. This arrangement ensures that neither the filter housing nor the raw air duct can touch or contact sharp-edged openings in a partition plate. Consequently, damage to the air intake system through the adapter pertaining to the air intake system is virtually eliminated. In this context, the partition plate frequently forms a part of the vehicle bodywork and is disposed in the area of a wheel housing of the vehicle. This partition plate can form a part of the vehicle bodywork and therefore pertains to the supporting parts of a vehicle.

The adapter is preferably configured as tubular and the first receiving opening is an opening of a tubular first attachment of the adapter. This attachment is aligned toward the air intake region, the air intake region preferably being disposed in the direction of travel upstream of a cooling system of the vehicle. A tubular end of the raw air duct can be mounted on the attachment of the adapter. Alternatively, it is also possible to insert the tubular end of the raw air duct into the tubular first attachment of the adapter. In this connection, tubular is understood merely as a tubular hollow body, which is open at both ends. The profile of the tubular hollow body can not only be a cylinder profile, but a hollow profile that is adapted to the circumstances in the engine compartment and in the air intake region.

In a preferred embodiment of the invention, the first attachment of the adapter is connected positively and detachably to one end of the raw air duct. The position connection can be achieved whereby preferably at least one snap hook is provided, which is disposed either at the end of the raw air duct or at the first attachment of the adapter and snaps positively into a corresponding recess either of the attachment of the adapter or into an end of the duct. This ensures a rapid and time-saving mounting of the raw air duct and can be executed completely independently of the attachment of the air filter housing.

The second receiving opening, which is provided opposite to the first receiving opening in the adapter, forms an opening of a second tubular attachment of the adapter, wherein the second attachment is now aligned to the filter housing in the engine compartment. In this context, the inside width of the second attachment is preferably adapted to an intake connecting piece of the filter housing for raw air. With this intake connecting piece, the filter housing can be simply inserted into the second attachment of the adapter. At the same time, this connection between adapter and intake connecting piece of the filter housing then forms a bearing point of the filter housing, so that the filter housing merely requires two further fastening points in order to be fastened in a statically defined manner in the engine region, preferably on the wheel housing of the vehicle.

In addition, it is provided that the second receiving opening of the adapter is provided with a flange-like collar. The collar is fixed on the vehicle bodywork. The collar can at the same time advantageously serve to anchor the adapter on the bodywork in a predetermined position. This anchoring can be secured by rivets, by clips, or by screw connections.

In a further embodiment of the invention, a rubber-elastic mass is disposed between the intake connecting piece of the filter housing and the second attachment of the adapter. This rubber-elastic mass provides for a decoupling of movement between the intake connecting piece of the filter housing and the bodywork or also the further raw air duct. This rubber-elastic mass can be an elastoplast of an elastomer plastic or it can be a sealing element of rubber-elastic mass disposed between the second attachment of the adapter and the intake connecting piece of the filter housing. In this case, the adapter comprises an outer hard plastic shell and is supported on the bodywork. The filter housing is vibration-mechanically decoupled from the raw air duct and the bodywork through the rubber-elastic mass disposed between the hard plastic shell of the adapter and the relatively stiff intake connecting piece of the filter housing. With this air filter system it is possible to provide extremely complex raw air ducts and complex air filter housings for a vehicle without the complexity leading to mounting or manufacturing problems.

A method for mounting an air filter system in a vehicle with a raw air duct in an air intake region and a filter housing in an engine compartment thus advantageously comprises the following process steps. Initially, an adapter of the air filter system with a first receiving opening toward the air intake region and a second receiving opening opposite the first opening toward the engine compartment in fixed in a bodywork opening between the engine compartment and the air intake region. This fixing can already take place if an access to the bodywork opening is achieved in the production sequence. At an appropriate time, one end of the raw air duct can be inserted into the first receiving opening of the adapter without being dependent on the temporary attachment of the filter housing. At another time in the production sequence, an intake connecting piece of the filter housing can then be inserted into the second receiving opening of the adapter.

A bodywork opening in a partition plate between engine compartment and air intake region can serve for fixing the adapter to the bodywork. Thus, the adapter is preferably disposed in a bodywork opening in the area of a wheel housing of the vehicle. For mounting, the raw air duct with the tubular end can be pushed over a first tubular attachment of the adapter having the first receiving opening. It is also possible that the tubular end of the raw air duct is inserted into the tubular attachment of the adapter.

In both cases, a positive but detachable connection is made between tubular ends of the raw air duct when mounting with a first tubular attachment of the adapter. The positive connection can also be assisted by a snap hook, which engages in a corresponding recess. In this case, the snap hook can be disposed either on the raw air duct or on the first attachment of the adapter.

At a time in the production sequence independent of the mounting of the raw air duct, the intake connecting piece of the filter housing may then be inserted into a second tubular attachment with the second receiving opening of the adapter, a rubber-elastic mass being provided between the second tubular attachment and the intake connecting piece to decouple vibrations of the filter housing from the bodywork and from the raw air duct. An elastoplast of an elastomer plastic is preferably used as rubber-elastic mass or a sealing element of a rubber-elastic mass is disposed between the second attachment of the adapter and the intake connecting piece of the filter housing.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary or background or the following detailed description.

Figure 1:
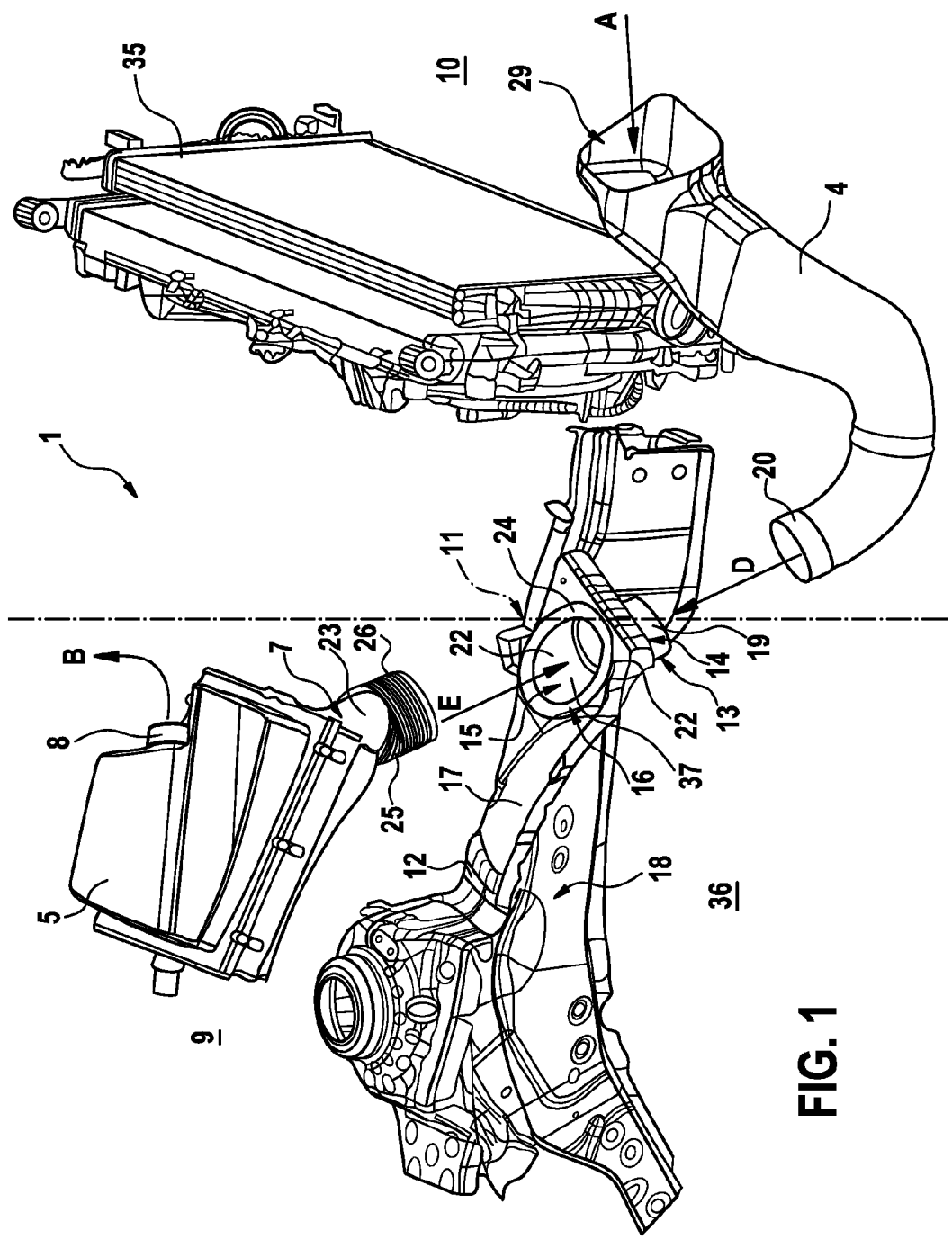
FIG. 1 shows a schematic perspective view of a side region of an engine compartment with an air filter system of one embodiment of the invention.

FIG. 1 shows a schematic perspective view of a side region of an engine compartment 9 with an air filter system 1 of one embodiment of the invention. In this case, the side region is substantially taken from a wheel housing 18 of a front wheel. A dot-dash line characterizes in FIG. 1 the transition zone 11 between the engine compartment 9 with the laterally disposed wheel housing 18, as well as with a filter housing 5, which is to be disposed on the wheel housing 18, and an air intake region 10, in which an air intake opening 29 of a raw air duct 4 is disposed. The cooler device 35 of the vehicle is disposed between engine compartment 9 and air intake region 10.

In addition to the raw air duct 4 and the filter housing 5, an adapter 13 also pertains to the air filter system 1, this adapter being disposed in a bodywork opening 16 and having a first tubular attachment 19 with a first receiving opening 14 toward the air intake region 10. The first receiving opening 14 can receive one end 20 of the raw air duct 4 if the raw air duct 4 is placed onto the first tubular attachment 19 of the adapter 13 in the direction of arrow D.

Independent of the mounting of the raw air duct 4, a second receiving opening 15, which continues in a second tubular attachment 22 in the bodywork opening 16, can receive an intake connecting piece 23 at the raw air input 7 of the filter housing 5. For this purpose, the filter housing 5 with the intake connecting piece 23 is pushed into the second receiving opening 15 of the adapter 13 in the direction of arrow E. In this case, a rubber-elastic mass 25, which is a sealing element 26 in this embodiment of the invention, is located between the second tubular attachment 22 and the intake connecting piece 23. A vibrational decoupling between the engine compartment components and the bodywork is achieved through the rubber-elastic mass 25.

Figure 4:
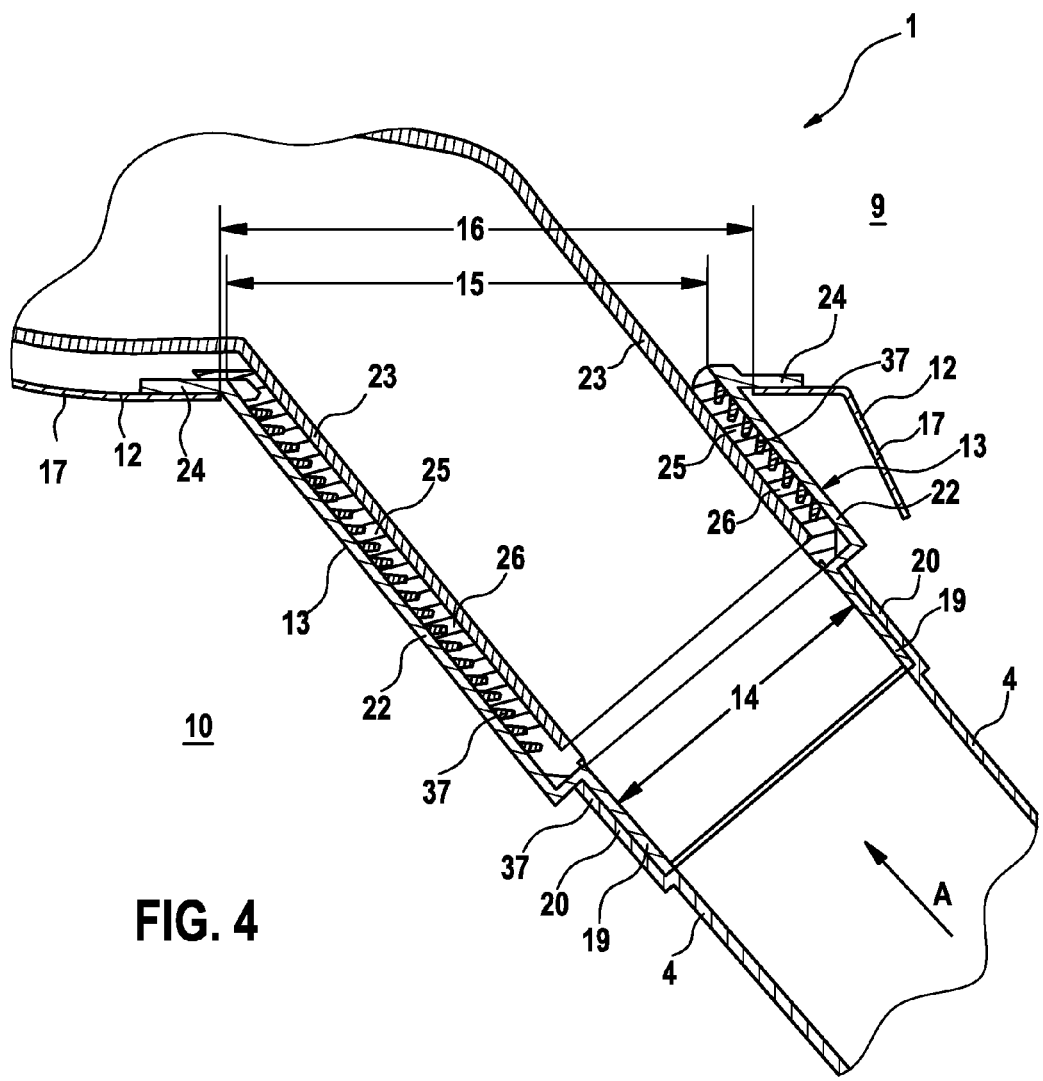
FIG. 4 shows a schematic cross section through an adapter of the air filter system according to the embodiment of FIG. 1.

In order to protect both the intake connecting piece 23 and also the end 20 of the raw air duct 4 from damage through the bodywork opening 16, the adapter 13 has a flange-like collar 24 at its second receiving opening, which ensures that a hard plastic shell 37 of the adapter 13 can be displaced from the position shown in FIG. 4. To this end, a flange-like collar 24 of the hard shell 37 of the adapter 13 can be additionally fixed on the partition plate 17 between engine compartment 9 and wheel area 36 with fastening means.

The filter housing 5 not yet mounted in FIG. 1 comprises an intake connecting piece 23 at a raw air inlet 7, which connecting piece can be inserted into the second receiving opening 15 of the adapter 13, when the filter housing 5 is fed onto the adapter 13 in the direction of arrow E. In this case, a rubber-elastic mass 25 is disposed between the second tubular attachment 22 of the adapter 13 and the intake connecting piece 23 of the filter housing 5, which rubber-elastic mass is inserted, for example, in this embodiment of the invention, into the adapter 13 with the aid of a rubber-elastic sealing element 26. By this means, decoupling of the vibration behavior of the filter housing 5 and the bodywork 12 can be achieved.

The filter housing 5 is constructed of two chambers, an air filter for air cleaning being disposed there between. While the intake connecting piece 23 supplies the raw air to a lower chamber, the filtered air is made available at the filtered air outlet 8 in the direction of arrow B for the internal combustion engine and other consumers of the vehicle.

Figure 2:
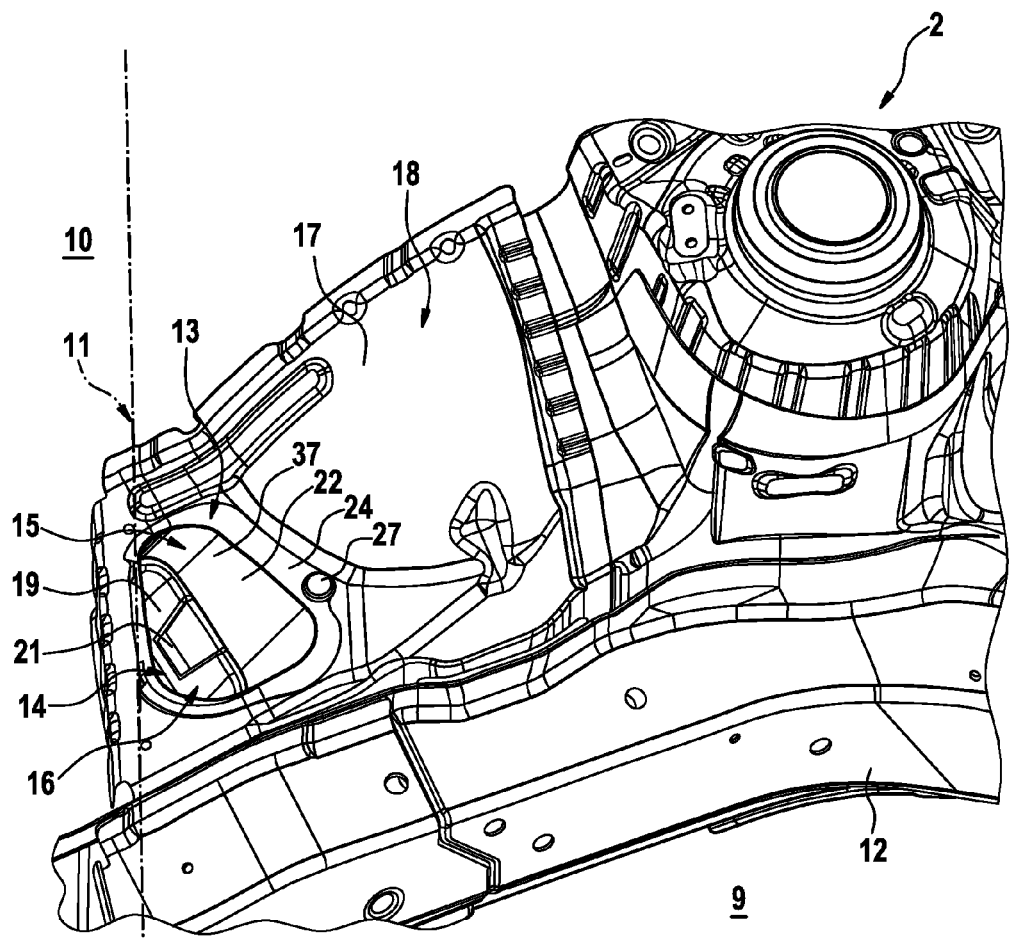
FIG. 2 shows a schematic perspective view of a wheel housing with an adapter of the air filter system according to a second embodiment of the invention.

FIG. 2 shows a schematic perspective view of a wheel housing 18 with an adapter 13 disposed in an opening 16 of the wheel housing. The adapter comprises a hard plastic shell 37 of the air filter system 1 according to a second embodiment of the invention. The difference between this adapter 13 and the adapter 13 shown in FIG. 1 for the first embodiment of the invention, is in a somewhat more complex cross-sectional profile, which is indeed tubular as previously, but in this embodiment of the invention, resembles a triangle with rounded corners.

Since the view is from above into the adapter 16, the collar 24 with its fastening eye 27, which fixes the adapter 13 on a partition plate 17 of the wheel housing 18 can be clearly identified. The second tubular attachment 22 for receiving an intake connecting piece of the filter housing goes over into a first tubular attachment 19. The first tubular attachment 19 has a recess 21 in which, for example, a snap hook of the raw air duct 4 can engage to fix one end of the raw air duct 4 on the first tubular attachment 14. In FIG. 2 the transition zone between engine compartment 9 and air intake region 10 is also marked by a dot-dash line.

Figure 3:
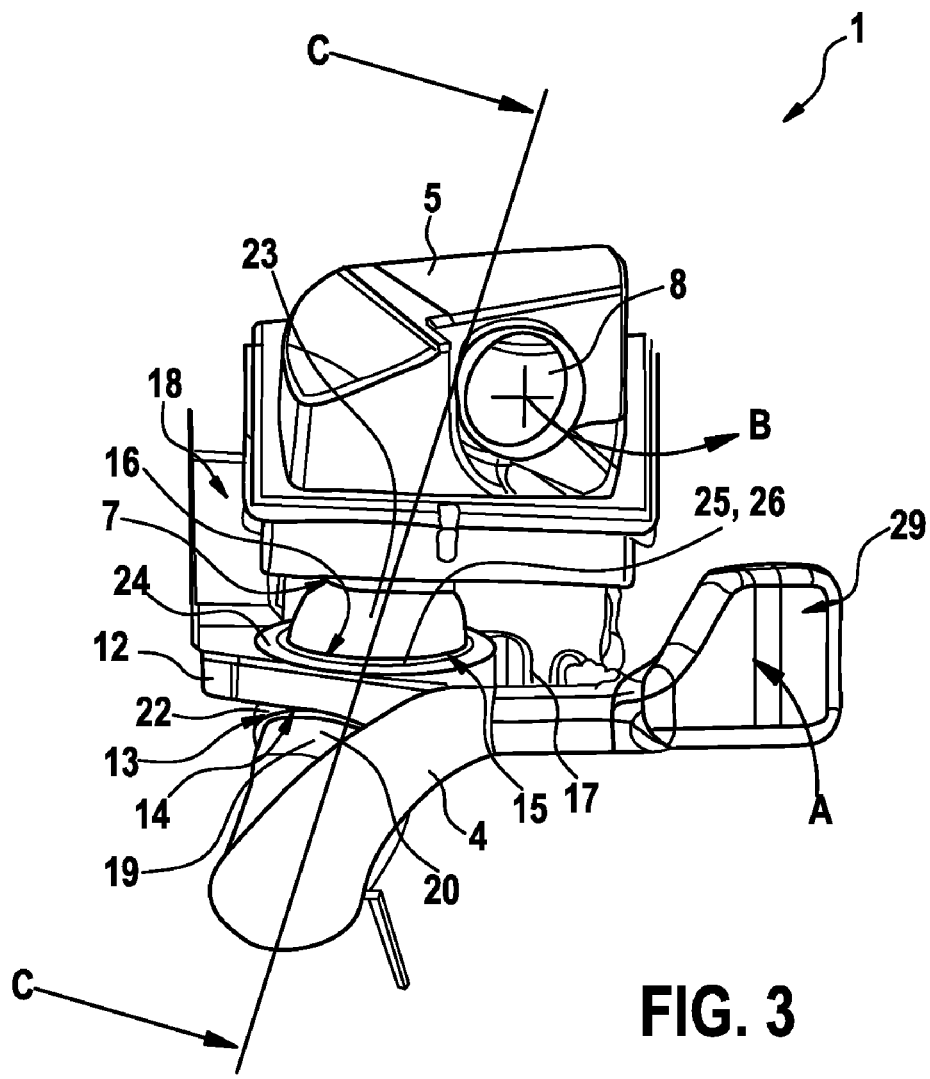
FIG. 3 shows a schematic perspective view of the mounted air filter system according to the embodiment of FIG. 1.

FIG. 3 shows a schematic perspective view of the mounted air filter system 1 according to the embodiment of FIG. 1. For this purpose, the cooler device as depicted in FIG. 1, is omitted in order to illustrate the cooperation between raw air duct 4, adapter 13, and filter housing 5. Components having the same functions as in the previous figures are characterized with the same reference numerals and are not discussed separately. The arrow A shows the intake of raw air via the intake opening 29 of the raw air duct 4 in the air intake region of the vehicle and the arrow B shows the exit of the filtered air from the filtered air outlet 8 of the filter housing 5, a filtered air duct being omitted in this representation. In order to illustrate the structure of the adapter, a plane of intersection is placed along the lines of intersection C-C through the adapter 13 and is shown enlarged in the next figure.

FIG. 4 shows a schematic cross section through an adapter 13 of the air filter system 1 of the embodiment according to FIG. 1. The adapter 13 comprises a hard shell 37, which is divided into two sections. A lower first tubular attachment 29 has a first receiving opening 14, to which a tubular end 20 of the raw air duct 4 is adapted, in such a manner that the raw air duct 4 with the end 20 can be pushed over this first attachment 19 and can be connected positively to the first attachment 19 of the adapter 13.

A second section of the adapter 13 is adapted, on the one hand, to a bodywork opening 16 in the bodywork 12, which here in this example consists of a partition plate 17 of a wheel housing. The engine compartment 9 is disposed above the partition plate 17 and below the partition plate 17, it goes over into the air intake region 10. In order to fix the hard shell 37 on the partition plate 17, the hard shell 37 has a collar 24, which is anchored on the partition plate 17. Disposed between the hard shell 37 of the second tubular attachment 22 and an intake connecting piece 23 of the filter housing, which is inserted into the adapter 22 via the second receiving opening 15, is a rubber-elastic mass 26, which firstly acts in a sealing manner, secondly protects against damage to the intake connecting piece of the filter housing, and thirdly forms one of three fixed points of the filter housing in the engine compartment 9.

As a result of the large area of the connection between the intake connecting piece 23 and the hard shell 37 of the adapter 13, the intake connecting piece 23 can receive most of the weight of the filter housing. At the same time, a vibrational decoupling or vibration damping between filter housing and bodywork 12 is achieved through the rubber-elastic mass 25 between hard shell 37 and intake connecting piece 23.

Figure 5:
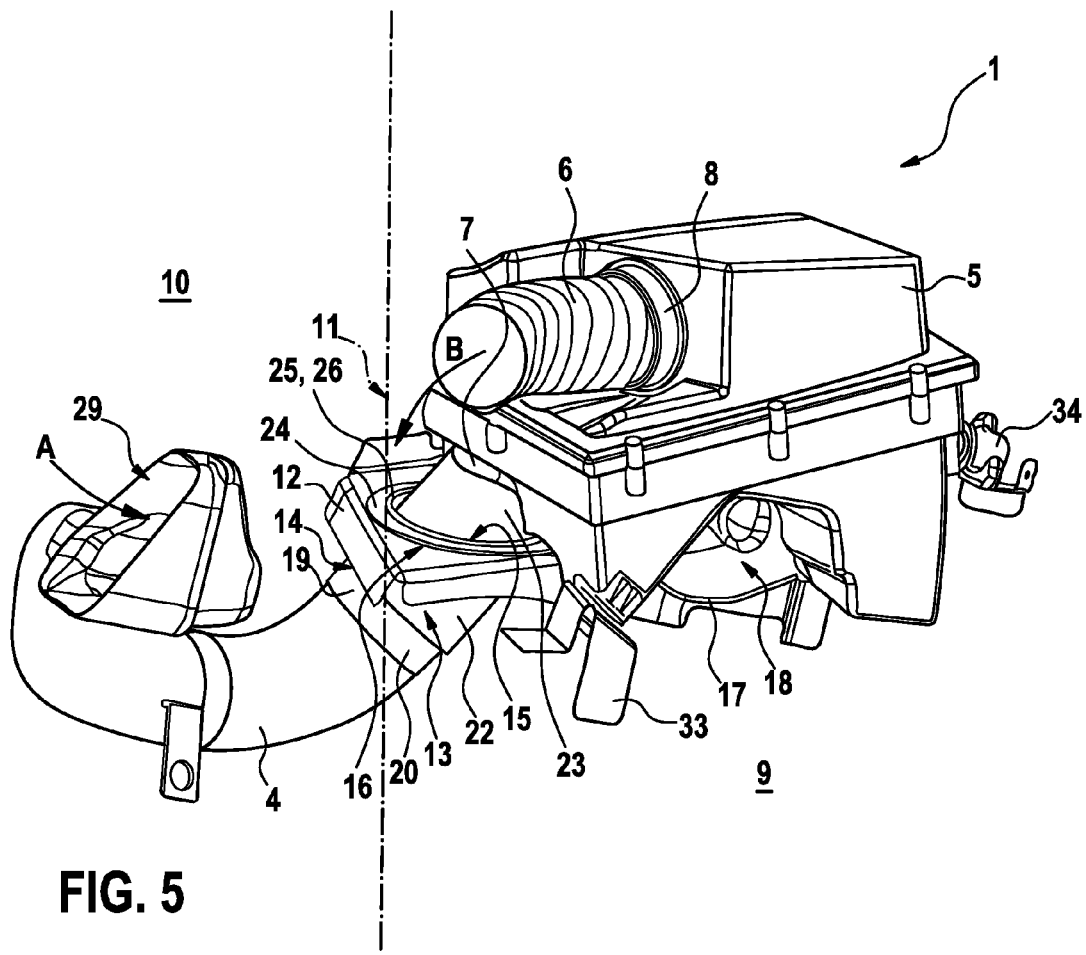
FIG. 5 shows a schematic perspective view of the mounted air filter system according to the embodiment of FIG. 1 from a different viewing angle.

FIG. 5 shows a schematic perspective view of the mounted air filter system 1 of the embodiment according to FIG. 1 from a different viewing angle compared to the previous views. The filter housing 5 is on the one hand mounted in a statically determined manner by means of the intake connecting piece 23, which fits in the adapter 13, and by means of two further fastening points 33 and 34, and delivers filtered air in the direction of arrow B via the air filter outlet 8 and the filtered air duct 6 to the internal combustion engine and other consumers of the vehicle. In FIG. 5 also, the transition zone 11 between the engine compartment 9 and the air intake region 10 is characterized by a dot-dash line.

The raw air is supplied in the direction of arrow A via the intake opening 29, the raw air duct 4, the adapter 13, and the intake connecting piece 23 of the filter housing 5 to the filter element of the filter housing 5 via a lower chamber and the filtered air in an upper filter chamber can be extracted from the filter housing in the filtered air outlet 8. FIG. 5 clearly shows the mounting advantage of such an air filter system 1 compared with the air filter system 3, such as is known from the prior art, since the air filter system 1 is assigned an adapter 13, which is supported in an opening 16 of the bodywork 12 and thus constitutes a separating region both for mounting, maintenance, repair, and exchange of the air filter system, which not only simplifies mounting but at the same time takes on supporting functions, protective functions, and damping functions for the air filter system 1.

Figure 6:
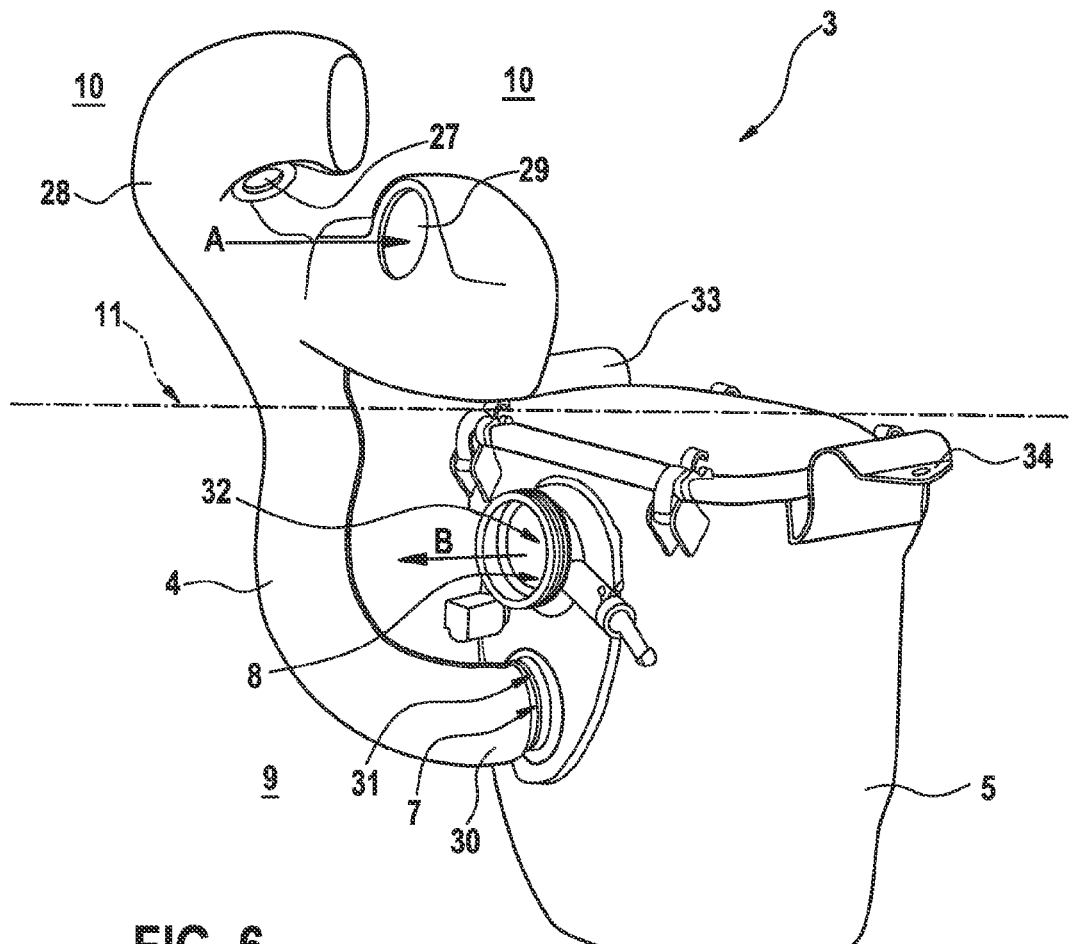
FIG. 6 shows a schematic perspective view of an air filter system according to the prior art.

FIG. 6 shows a schematic perspective view of an air filter system according to the prior art that has already been discussed in the introduction.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An air filter system for a vehicle having an engine compartment, an air intake region that is separate from the engine compartment and a wheel housing, comprising:
    an adapter supported on a partition plate of the wheel housing and disposed in a transition zone from the engine compartment to the air intake region, the adaptor having a first opening for toward the air intake region and a second opening opposite the first opening toward the engine compartment;
    a raw air duct disposed in the air intake region and extending to couple to the first opening of the adaptor for providing raw air;
    a rubber-elastic mass disposed in the engine compartment and coupled to the second opening of the adaptor;
    a filter housing with an air filter element disposed in the engine compartment and coupled to the rubber-elastic mass for receiving the raw air;
    a filtered air duct extending from the filter housing to an internal combustion engine;
    wherein the raw air duct may be independently coupled to the adaptor and the rubber-elastic mass provides vibrational decoupling between the filter housing and the wheel housing.

2. The air filter system according to claim 1, wherein the adapter is tubular and the first receiving opening is an opening of a first tubular attachment aligned toward the air intake region and on which a tubular end of the raw air duct is mounted.

3. The air filter system according to 1, wherein the adapter is tubular and the first receiving opening is an opening of a first tubular attachment aligned toward the air intake region and in which a tubular end of the raw air duct is inserted.

4. The air filter system according to claim 2, wherein the first tubular attachment is positively connected and detachable to one end of the raw air duct.

5. The air filter system according to claim 1, wherein a tubular end of the raw air duct has a snap hook and the snap hook is engaged in a corresponding recess of the first tubular attachment of the adapter.

6. The air filter system according to claim 1, wherein a snap hook is disposed on the first tubular attachment of the adapter and the snap hook of the adapter is engaged in a corresponding recess of a tubular end of the raw air duct.

7. The air filter system according to claim 1, wherein the second opening of the adaptor has a flange-like collar fixed on the partition plate of the wheel housing.

8. The air filter system according to claim 1, wherein the rubber-elastic mass is an elastomer plastic.

9. The air filter system according to claim 1, further comprising a sealing element of the rubber-elastic mass and the coupled to the filter housing.

10. A method for mounting an air filter system in a vehicle with a raw air duct in an air intake region, a filter housing in an engine compartment and a wheel housing, the method comprises the steps of:
    fixing an adapter with a first receiving opening toward the air intake region and a second receiving opening opposite said first receiving opening toward the engine compartment on a partition plate of the wheel housing disposed between the engine compartment and the air intake region;
    detachably coupling an end of the raw air duct into the first receiving opening to provide raw air from the air intake region to the adaptor; and
    inserting an intake connecting piece of the filter housing to a rubber-elastic mass;
    detachably coupling the rubber-elastic mass into the second receiving opening so that the filter housing may receive the raw air from the adaptor to the filter housing;
    whereby the raw air duct and the filter housing may be independently coupled and detached from the adaptor.

11. The method according to claim 10, further comprising the step of pushing a tubular end of the raw air duct over a first tubular attachment of the adapter having the first receiving opening.

12. The method according to claim 10, further comprising the step of inserting a tubular end of the raw air duct into a first tubular attachment of the adapter.

13. The method according to claim 11, further comprising the step of positively and detachably connecting the tubular end of the raw air duct to the first tubular attachment of the adapter.

14. The method according to claim 13, further comprising the step of engaging a snap hook in a corresponding recess for connection of the tubular end of the raw air duct and the first tubular attachment.

15. The method according to claim 10, wherein an elastoplast of an elastomer plastic is used as the rubber-elastic mass.

16. The method according to claim 15, further comprising the step of disposing a sealing element of the rubber-elastic mass between the second tubular attachment of the adapter and the intake connecting piece of the filter housing.

* * * * *